United States Patent
Manes

(10) Patent No.: US 9,278,806 B2
(45) Date of Patent: Mar. 8, 2016

(54) Z-DRIVE SHIPPING LOCK FOR STORAGE LIBRARY ROBOTIC ASSEMBLY

(71) Applicant: Oracle International Corporation, Redwood City, CA (US)

(72) Inventor: Joseph P. Manes, Arvada, CO (US)

(73) Assignee: Oracle International Corporation, Redwood City, CA (US)

( * ) Notice: Subject to any disclaimer, the term of this patent is extended or adjusted under 35 U.S.C. 154(b) by 429 days.

(21) Appl. No.: 13/852,694

(22) Filed: Mar. 28, 2013

(65) Prior Publication Data

US 2014/0271065 A1    Sep. 18, 2014

Related U.S. Application Data

(60) Provisional application No. 61/789,795, filed on Mar. 15, 2013.

(51) Int. Cl.
*B65G 1/10* (2006.01)
*G11B 15/68* (2006.01)

(52) U.S. Cl.
CPC ............... *B65G 1/10* (2013.01); *G11B 15/6835* (2013.01)

(58) Field of Classification Search
CPC .......................................................... B65G 1/10
USPC ............................................................ 414/281
See application file for complete search history.

(56) References Cited

U.S. PATENT DOCUMENTS

| | | | | |
|---|---|---|---|---|
| 5,901,916 A | * | 5/1999 | McAllister | G11B 23/043 242/338.1 |
| 6,034,850 A | * | 3/2000 | Del Genio | G11B 23/00 242/338.1 |
| 6,572,046 B2 | * | 6/2003 | Brummet | G11B 15/672 242/338.1 |
| 6,580,582 B1 | * | 6/2003 | Caverly | G11B 15/682 360/92.1 |
| 7,004,343 B2 | * | 2/2006 | Hiraguchi | G11B 15/6825 220/4.21 |
| 7,180,702 B2 | * | 2/2007 | Ellis | G11B 15/685 360/96.4 |
| 7,184,242 B1 | | 2/2007 | Ostwald et al. | |
| 7,701,662 B2 | * | 4/2010 | Schartau | G11B 15/673 360/85 |
| 7,777,986 B2 | * | 8/2010 | Barkley | G11B 15/6835 360/92.1 |

* cited by examiner

*Primary Examiner* — Ernesto Suarez
*Assistant Examiner* — Ashley Romano
(74) *Attorney, Agent, or Firm* — Marsh Fischmann & Breyfogle LLP; Jonathon A. Szumny

(57) ABSTRACT

A system for selectively disallowing unwinding of a storage library robotic mechanism cable assembly in a direction that would otherwise allow a platform of the robotic mechanism to move downwardly via the force of gravity while at the same time allowing for winding up of the cable assembly and the platform, such as during shipping, manual access, replacement of the robotic mechanism, and/or the like. The system may include a ratchet pawl for engaging between adjacent teeth of a drive assembly of the robotic mechanism and an actuator for selectively moving or allowing for movement of the ratchet pawl into and out of the engaged position. In one embodiment, the system may include an electric switch or the like to sense when the pawl is engaged with the drive assembly.

20 Claims, 12 Drawing Sheets

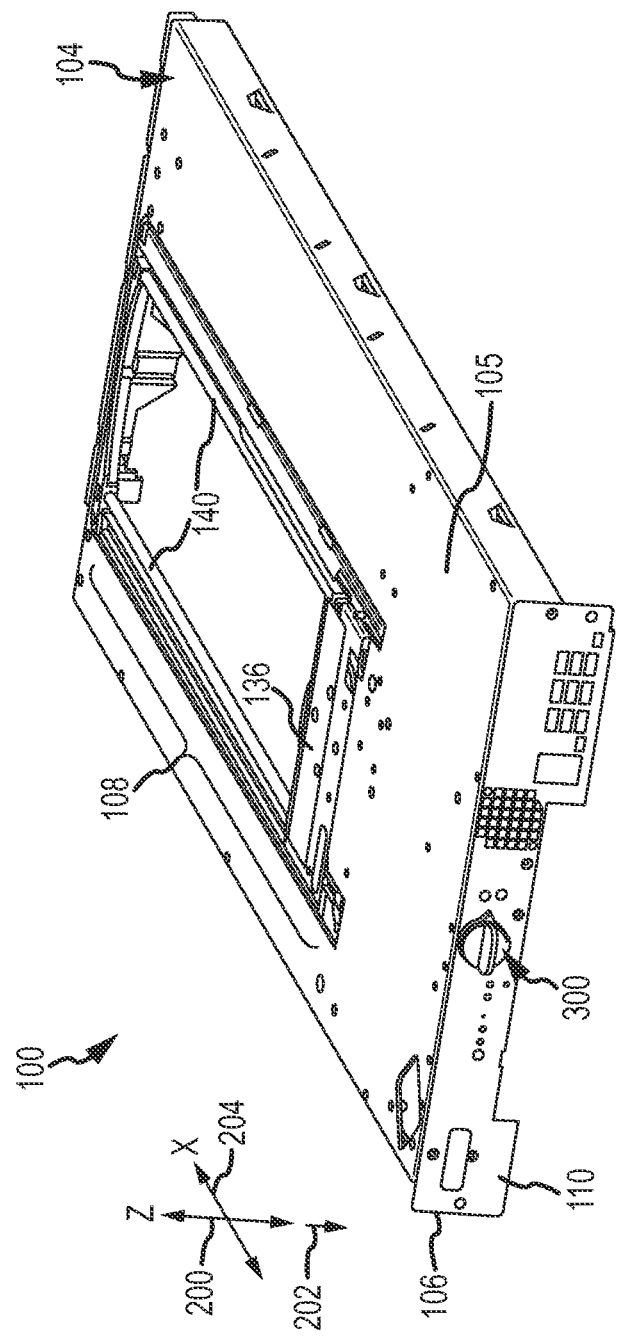

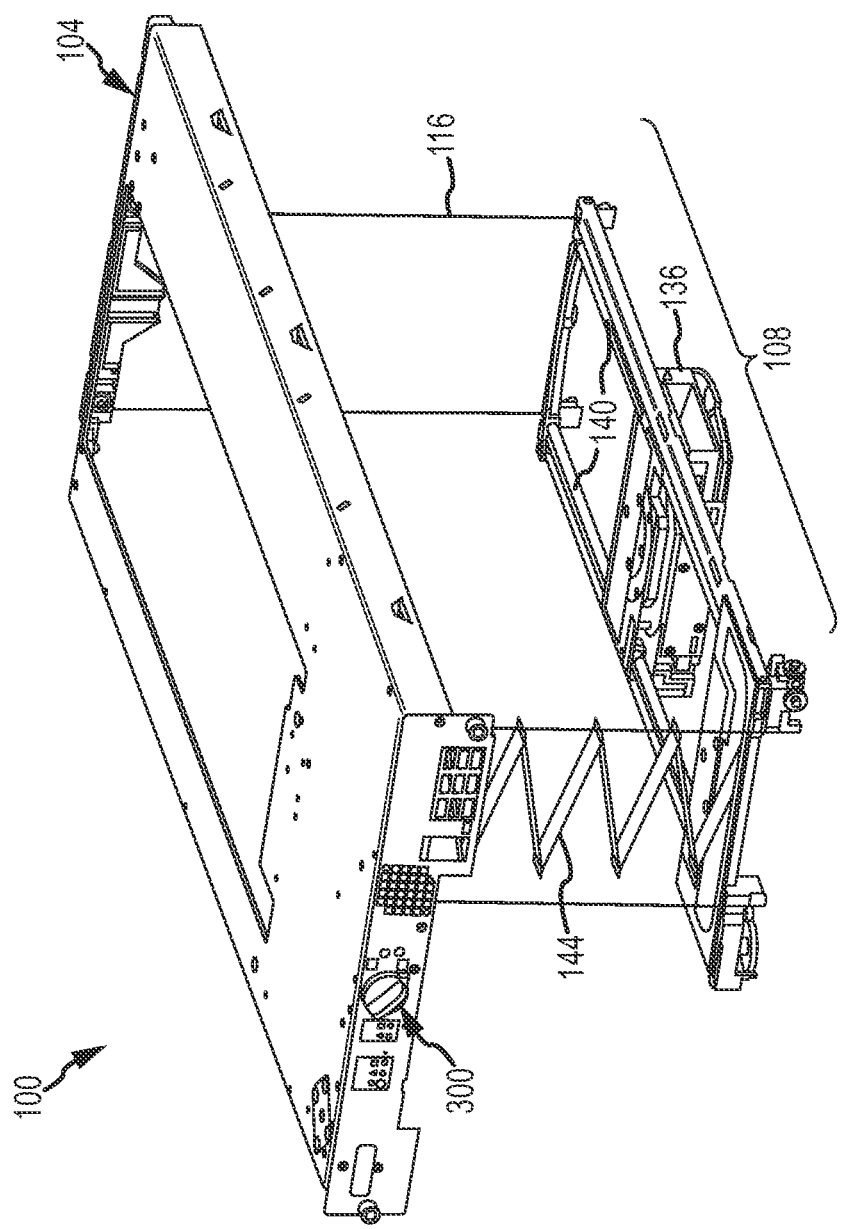

Z-DRIVE SHIPPING LOCK FOR STORAGE LIBRARY ROBOTIC ASSEMBLY

CROSS REFERENCE TO RELATED APPLICATIONS

This application claims priority to U.S. Provisional Application No. 61/789,795, entitled "Z-DRIVE SHIPPING LOCK FOR STORAGE LIBRARY ROBOTIC ASSEMBLY," filed on Mar. 15, 2013, the entire contents of which are incorporated herein by reference as if set forth in full.

BACKGROUND

1. Field of the Invention

The present invention relates generally to robotic assemblies operable to move a platform up and down along a Z-axis via a cable assembly to manipulate media elements within a storage library and, more particularly, to devices and methods that serve to selectively lock a drive assembly, such as during shipping or the like, against movement that would otherwise allow for back driving of the cable assembly and inadvertent dropping of the platform, all of which could lead to damage to the cable assembly and/or other components of the robotic assembly.

2. Relevant Background

Storage library systems are often used by enterprises and the like to efficiently store and retrieve data from storage media. In the case of some storage libraries, the media may be data cartridges (e.g., tape cartridges) that are typically stored and indexed within a set of magazines. When particular data is requested, for instance, a specialized robotic assembly or mechanism (e.g., robotic module) finds the appropriate cartridge, removes the cartridge from its magazine, and carries the cartridge to a drive that is designed to receive the cartridge and read its contents. Some storage libraries have multiple drives that can operate concurrently to perform input/output (IO) operations on multiple cartridges.

To operate properly, the robotic mechanisms are expected to reliably (e.g., repeatably and accurately) and rapidly find, retrieve, and deliver desired cartridges throughout the storage library cartridge inventory. Generally, a robotic mechanism may include a hand assembly that is operable to reliably grip a desired cartridge and remove it from a magazine or drive, or to reliably grip a cartridge and release the cartridge into a desired magazine slot or drive. The robotic mechanism may be configured to move the hand assembly in one or more axes (e.g., x, y, and Z-directions, and sometimes one or more of pitch, roll, or yaw), and may include one or more sensors to reliably detect the position and/or orientation of the hand assembly.

Different implementations of storage library systems move the hand assembly in the Z-direction (i.e., with and against the force of gravity, such as vertically with respect to the cartridge inventory) in different ways. Some implementations may use gears, tracks, belts, hydraulics, and/or other such control mechanisms. Other implementations associate the hand assembly with a platform or carriage that is held up by cables, ropes, or the like. By pulling on the cables (e.g. using pulleys, a spool, a drive motor, etc.), the platform or carriage can be lifted; by adding slack to the cables, the platform or carriage can be allowed to move in a downward direction under the force of gravity (e.g., in a substantially floating manner).

SUMMARY

It is generally desirable to prevent or at least limit the likelihood of inadvertent dropping or lowering (e.g., in the direction of gravity) of the platform assembly (and the hand assembly connected thereto) of a storage library robotic assembly in order to limit damage from occurring to the cable assembly, the platform assembly, and/or other components of the robotic assembly. Before shipping or manually accessing the storage library, for instance, current platforms are typically spooled up (by fully winding up the cable assembly) and then locked against movement in either direction along the Z-axis. For instance, current arrangements include a pawl or the like that is inserted between adjacent teeth of a driving gear of the robotic assembly to prevent motion of the platform in either direction along the Z-axis.

However, the platform assembly of current robotic assemblies is still free to move down along the Z-axis unless the pawl is fully engaged with the teeth of the driving gear, such as while the platform assembly is being spooled up (e.g., refracted, wound up, etc.). In this regard, any break or loss in the taking up of the cable during the platform assembly refraction process may allow the platform to fall or drop (e.g., possibly violently) due to the force of gravity. Furthermore, locking of the cable assembly in both directions along the Z-axis during shipping or the like thus restricts movement of the cable assembly and driving gear that would otherwise tend to further retract and thus more fully secure the platform and cable assembly during shipping. Still further, the pawl or the like of current arrangements is a separate part that must be removed to allow the robotic assembly to operate, must be placed elsewhere and stored for future use, and that is susceptible to loss.

In view of the foregoing, disclosed herein is a system for selectively preventing or limiting unwinding of a storage library robotic mechanism cable assembly in a direction that would allow a platform assembly of the robotic mechanism to move in a Z-direction (e.g., along a Z-axis) via the force of gravity (when in an engaged position) but that, when in the engaged position, still allows for retraction/winding up of the cable assembly and spooling up of the platform assembly to allow for increased levels of securement of the cable assembly and platform assembly such as during shipping, manual access, removal of the robotic assembly and/or the like. Broadly, the disclosed system may be incorporated into a robotic mechanism of a storage library and may include a ratchet pawl configured to selectively engage the gear teeth of a gear of the drive assembly responsible for moving the platform assembly and cable assembly along the Z-axis (in one of at least first and second positions of the ratchet pawl) to allow for retraction/spooling up/winding up of the cable assembly and platform assembly but to disallow unwinding of the cable assembly and thus dropping of the platform assembly while engaged with the gear teeth. The disclosed system also includes an actuator (e.g., including a knob, lever, switch) that is movable (e.g., rotatable, translatable, slidable, flippable) between at least engaged and disengaged positions to correspondingly move or allow for movement of the ratchet pawl into the first and second positions, respectively.

As an example, the ratchet pawl of the disclosed system may be in the form of a ratchet spring (e.g., leaf spring) having a mounting portion or member rigidly secured (e.g., via bolts and nuts, rivets, etc.) to a portion of the chassis of the robotic assembly and an engagement portion or member movable between at least a first, disengaged position from the gear teeth of a drive gear of the drive assembly and a second, engaged position with the gear teeth, where the second, engaged position is a substantially non-deflected/relaxed position of the spring-loaded engagement member, or at least a lower level of deflection that when in the first, disengaged position. The engagement member may be shaped or otherwise oriented so that when engaged between adjacent gear teeth, the engagement member disallows movement of the drive gear in a rotational direction that would otherwise allow for extension of a cable assembly and dropping of the platform assembly of the robotic assembly but still allows for movement (e.g., ratcheting movement) of the drive gear in an opposing rotational direction that allows for winding up of the cable assembly and corresponding spooling up of the platform assembly. In this example, the actuator may include a handle (e.g., knob) that is manipulatable (e.g., rotatable) by a user and a cam member rigidly interconnected to the handle that is designed to engage and urge the ratchet spring into a deflected position away from the teeth of the drive gear upon manipulation of the handle.

During normal operation of the robotic assembly of a storage library (e.g., when the robotic assembly is being operated to grab tape cartridges, insert the same into tape drives, etc.), a user may twist or otherwise position the actuator of the disclosed system into a first position so that the cam member engages and exerts a force against the leaf spring so as to move the engagement member of the leaf spring away from the gear teeth of the drive or other gear. In this position of the actuator, the gear is free to move in first and second rotational directions as part of raising or lowering the cable assembly and thus the platform assembly.

When it is desired to disallow or limit movement of the drive gear in one of the first and second rotational directions that would otherwise allow for unwinding of a cable assembly and possible dropping of platform assembly of the robotic assembly (e.g., during shipping, manual access, replacement of the robotic assembly, etc.), a user may twist/position the actuator into a second position to induce a corresponding movement of the cam member into a position that allows the ratchet spring to move at least partially away from its deflected position and into engagement with or at least between adjacent teeth of the drive gear of the Z-drive assembly. Stated differently, movement of the actuator and thus the cam member into its second position removes the opposing force previously being applied by the cam member against the ratchet spring and allows the ratchet spring to move (e.g., spring) back into its second, engaged position with respect to the gear teeth. Thereafter, the robotic assembly may be operated to retract/spool up the cable assembly and platform assembly into a (e.g., fully retracted) storage position or the like substantially free of any likelihood of the cable assembly unwinding in a direction that would otherwise drop or lower the platform assembly along with any related risks of damage or the like. Further advantageously, any vibrations or the like transmitted to the robotic assembly during shipping, storage or the like may substantially only allow for movement of the drive gear in a rotational direction that would allow for only further retraction/spooling/tightening up of the cable assembly and thus further limiting of unintended movement of the cable assembly and platform assembly.

In one aspect, a robotics module for manipulating media elements in a storage library includes a chassis, a platform assembly for manipulating media elements in a storage library, a drive assembly including a suspension cable reel secured to the chassis, a cable assembly secured between the suspension cable reel and the platform, and a locking system secured to the chassis and manipulatable between at least first and second configurations. Rotation of the suspension cable reel in a first rotation direction unwinds the cable assembly from the suspension cable reel and allows the platform assembly to move in a first direction along an axis relative to media elements in the storage library, and rotation of the suspension cable reel in an opposed second rotation direction winds the cable assembly on the suspension cable reel and moves the platform assembly in an opposed second direction along the axis relative to the media elements in the storage library. Manipulation of the locking system into the first configuration allows the suspension cable reel to move in either of the first and second rotation directions, and manipulation of the locking system into the second configuration disallows the suspension cable reel from moving in the first rotation direction and allows the suspension cable reel to move in the second rotation direction.

In another aspect, a locking subsystem of a drive assembly includes a spring-loaded ratchet pawl including a portion thereof movable between at least a first position in which the ratchet pawl is configured to be disengaged from between adjacent gear teeth of the drive assembly to allow rotational movement of the drive assembly in both of first and second opposing rotational directions and a second position in which the ratchet pawl is configured to engage between adjacent gear teeth of the drive gear of the drive assembly to disallow rotational movement of the drive assembly in the first rotational direction and allow rotational movement of the drive assembly in the opposing second rotational direction, a handle movable between at least first and second positions, and a cam member rigidly secured to the handle and movable between the first and second positions of the handle. The cam member urges the pawl into the first pawl position in the first handle position, and the pawl moves into the second pawl position in the second handle position.

In a further aspect, a method for use with a drive assembly of a robotics module of a storage library includes, where the drive assembly is configured to wind and unwind a cable assembly from a suspension cable reel of the drive assembly to respectively raise or lower a platform of the robotics module, first positioning an actuator of the robotics module into one of at least first and second positions of the actuator; and engaging, in response to the first positioning, a portion of a ratchet pawl between adjacent teeth of a gear of the drive assembly to disallow unwinding of the cable assembly and corresponding lowering of the platform.

Any of the embodiments, arrangements, or the like discussed herein may be used (either alone or in combination with other embodiments, arrangement, or the like) with any of the disclosed aspects. Merely introducing a feature in accordance with commonly accepted antecedent basis practice does not limit the corresponding feature to the singular. Any failure to use phrases such as "at least one" does not limit the corresponding feature to the singular. Use of the phrase "at least generally," "at least partially," "substantially" or the like in relation to a particular feature encompasses the corresponding characteristic and insubstantial variations thereof. Furthermore, a reference of a feature in conjunction with the phrase "in one embodiment" does not limit the use of the feature to a single embodiment.

In addition to the exemplary aspects and embodiments described above, further aspects and embodiments will become apparent by reference to the drawings and by study of the following descriptions.

BRIEF DESCRIPTION OF THE DRAWINGS

FIG. 2a is a top perspective view of a robotics module for use in the storage library of FIG. 1, where a platform and cable assembly of the robotics module are in a refracted or "spooled up" configuration.

FIG. 2b is a perspective view similar to FIG. 2a, but with the platform and cable assembly in a lowered or unwound configuration.

FIG. 3 is a bottom perspective view of the robotics module of FIG. 2a.

FIG. 4 is a close-up perspective view of a locking system disclosed herein secured to a chassis of the robotics module of FIG. 2a.

DETAILED DESCRIPTION

Disclosed herein are systems and methods for selectively disallowing unwinding of a storage library robotic mechanism cable assembly in a direction that would otherwise allow a platform assembly of the robotic mechanism to move downwardly via the force of gravity while at the same time allowing for winding up of the cable assembly and the platform, such as during shipping, manual access, replacement of the robotic mechanism, and/or the like. The disclosed systems and methods advantageously prevent or at least reduce the likelihood of the cable assembly inadvertently unwinding in a manner that would otherwise drop or lower the platform assembly along with any related risks of damage or the like. Further advantageously, any vibrations or the like transmitted to the robotic assembly during shipping, storage, replacement or the like may substantially only allow for movement of the drive gear in a rotational direction that would allow for only further retraction/spooling/tightening up of the cable assembly and thus further limiting of unintended movement of the cable assembly and platform.

Figure 1:
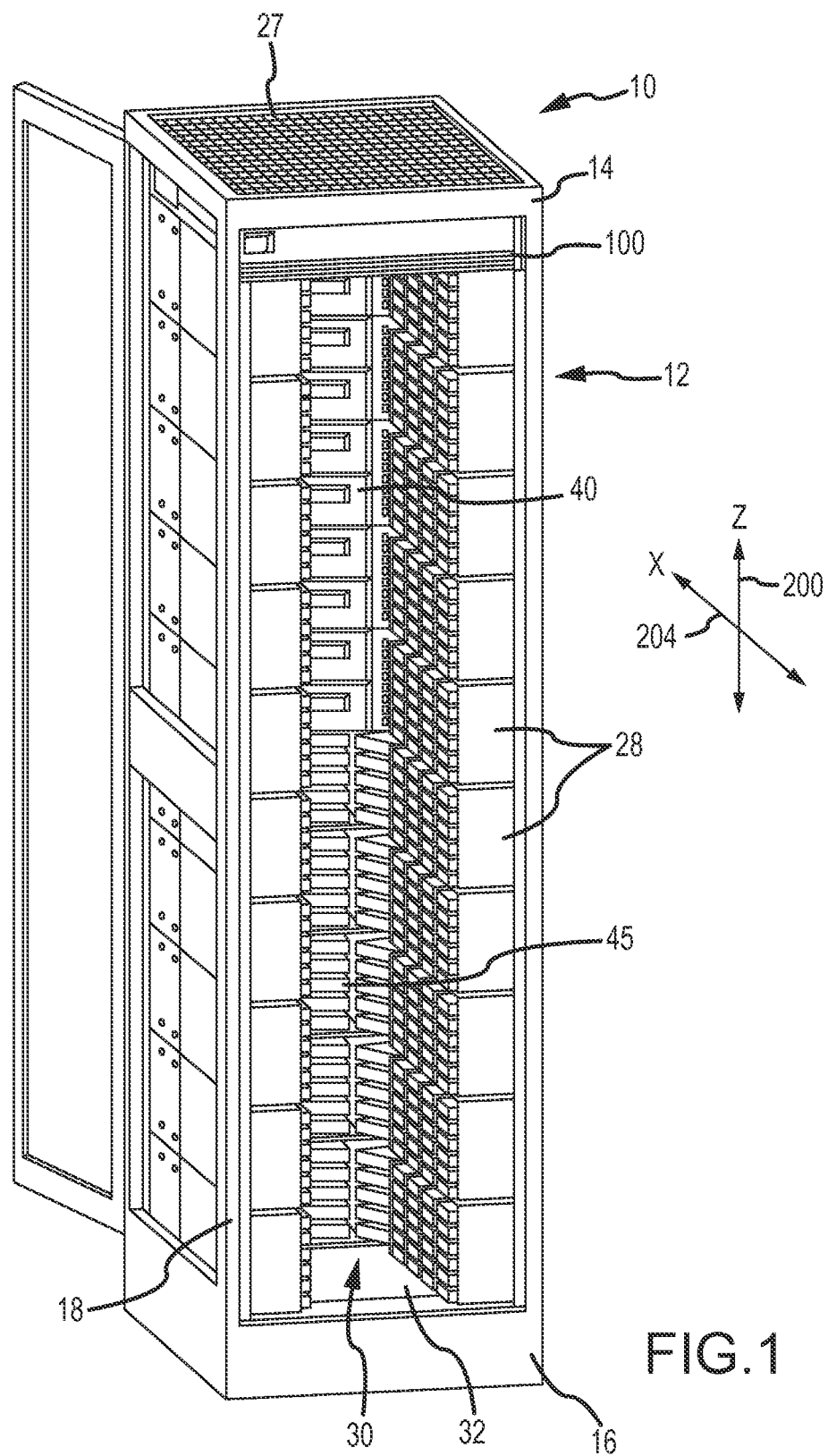
FIG. 1 is a perspective view of a storage library within which the locking system disclosed herein may be utilized.

With initial reference to FIG. 1, one embodiment of a storage library 10 is illustrated within which the locking system and related methods disclosed herein may be implemented. Broadly, the storage library 10 may be a data storage and retrieval system for one or more computers, servers, and/or the like and may be designed for handling and storing a plurality of media elements and for reading and writing to the media elements using media element players. As used herein, a media element denotes any physical substrate suitable for storing data, such as a tape cartridge. A media element player may be a media element reader and/or writer (such as a tape drive) that translates the data stored on a media element into signals readable by a computer and/or server for reading operations and/or writes data to the media element in response to a command from the computer and/or server for writing operations. While FIG. 1 illustrates one embodiment of a storage library, it is to be understood that the locking system and methods disclosed herein may be utilized in numerous other arrangements and contexts in which it is desired to selectively disallow or limit unwinding of a cable assembly and corresponding lowering of a platform assembly or the like connected to the cable assembly.

Generally, the storage library 10 may include a rack 12 (e.g., in the form of a vertically upright, rectangular form or framework) formed by top and bottom rack portions 14, 16 in addition to a plurality of legs 18 extending therebetween (e.g., such as between respective corners of the top and bottom rack portions 14, 16). The various legs 18 may form an interior portion 30 therewithin and the bottom rack portion 16 may be placed on a support structure such as a floor to support the weight of the storage library 10. A plurality of removable storage library modules 28 (e.g., magazines) of any appropriate form factors may be positioned within respective bays (not labeled) in the interior portion 30 of the rack 12, where the various bays may be spaced by any appropriate spacing such as by 1U, 2U, or the like. While not shown, each storage library module 28 may be removably secured to the rack 12 such as via latches, thumbscrews, and/or the like. Furthermore, each storage library module 28 may include one or more media elements 45 (e.g., tape cartridges) and/or media element players 40 (e.g., tape drives) within individual cells or slots of the storage library module 28. The capacity of storage library 10 may be expanded by inserting storage library modules 28 into the rack 12 or reduced by removing storage library modules 28 from the rack 12.

To manipulate one or more of the media elements 45 (e.g., removing a media element 45 from a storage library module 28 and inserting the same into a media element player 40 for reading and/or writing of data, removing a media element 45 from a media element player 40 and inserting the same into the cell of a storage library module 28, reading labels on the media players 40 or media elements 45, etc.), a media element handling robotics module 100 may be positioned within the interior portion 30 of the rack 12, such as adjacent the top rack portion 14. For instance, the robotics module 100 may include media element handling robotics and may be plugged/inserted into and removed from a bay or slot within the interior portion 30 of the rack 12 in a modular manner. While not shown, a removable power/controller module may be positioned within the interior portion 30 of the rack 12 (e.g., such as adjacent the top rack portion 14 at a rear of the rack 12) including a power supply for supplying the power required by the robotics module 100 to manipulate the media elements 45 and control electronics for generating electrical control signals to control the operation of the robotics module 100. For instance, the power/controller module may be plugged into and removed from a respective bay or slot of the rack 12. The power/controller module may include or be associated with any appropriate computer program products, i.e., one or more modules of computer program instructions encoded on a non-transitory computer-readable medium for execution by, or to control the operation of, a data processing apparatus. In this regard, the power/controller module may encompass one or more apparatuses, devices, and machines for processing data, including by way of example a programmable processor, a computer, or multiple processors or computers.

Figure 3:
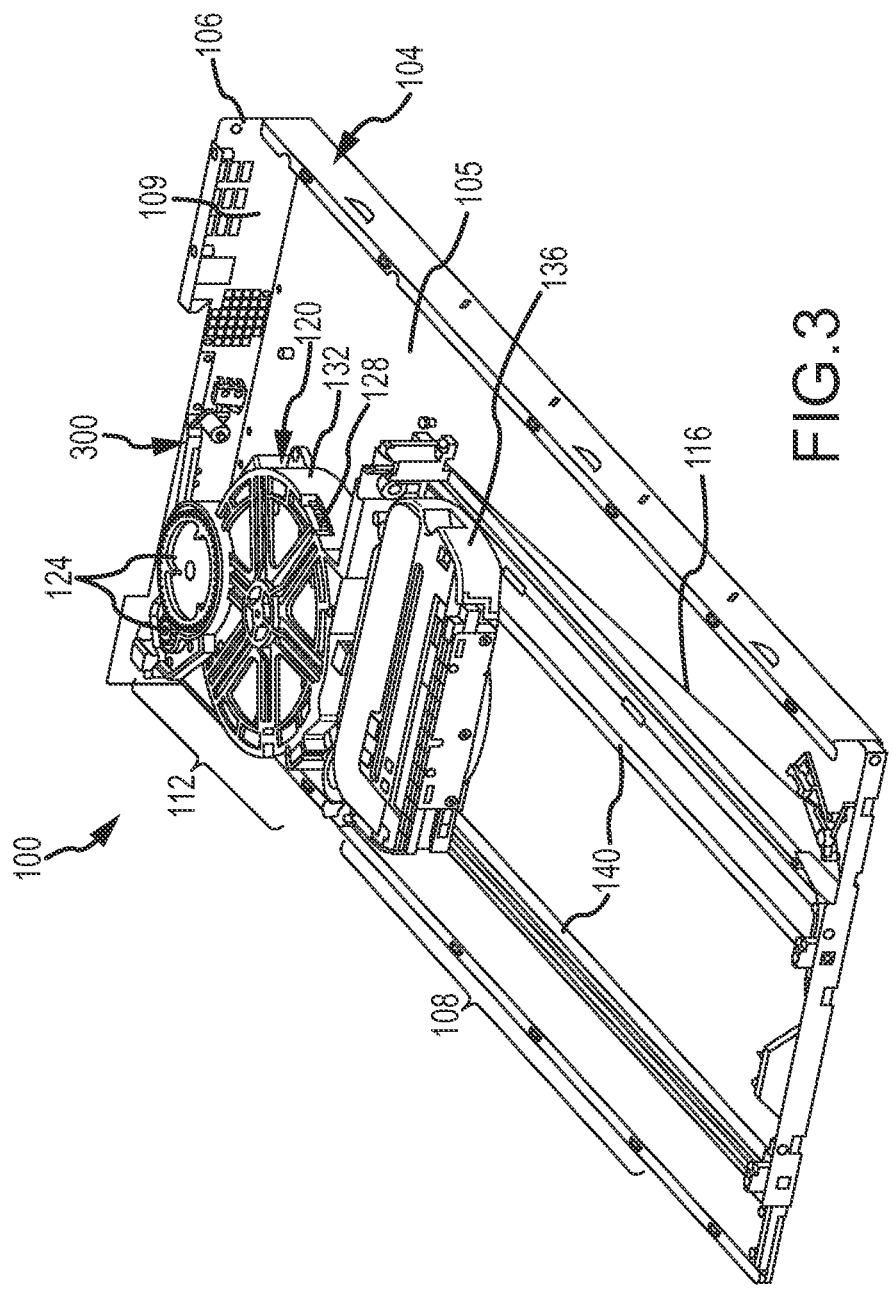

With additional reference now to FIGS. 2a and 3, top and bottom perspective views of the robotics module 100 (removed from the storage library 10) are illustrated. Broadly, the robotics module 100 includes a housing or chassis 104 from which a platform assembly 108 is configured to move towards and away along a Z-axis 200 (e.g., in first and second opposing directions) within a channel 32 in the interior portion 30 of the rack 12 to manipulate media elements 45. More specifically, the robotics module 100 may include a Z-axis drive assembly 112 appropriately secured to a bottom portion or wall 105 of the chassis 104 and a cable assembly 116 (e.g., including a number of ropes, cables, or the like) interconnected between the drive assembly 112 and the platform assembly 108, where the drive assembly 112 operates to wind (e.g., spool up, refract) or unwind (e.g., release) the cable assembly 116 to correspondingly raise or lower (e.g., the latter being via the force of gravity in the direction 202 along the Z-axis 200) the platform assembly 108 along the Z-axis 200 within the channel 32 of the rack 12.

For instance, the drive assembly 112 may include a number of components (e.g., gears, pulleys, drive motor, etc.) such as a cable take-up assembly 120 secured to or relative to the chassis 104, one or more drive gears 124 rotatably secured to or relative to the chassis 104, and a drive motor (not shown) secured to or relative to the chassis 104 and interconnected to the one or more drive gears 124 to drive the drive gears 124 in first and second opposing rotational directions. It is noted that the two drive gears 124 shown in FIG. 3 would simultaneously move in opposing rotational directions. The cable take-up assembly 120 may include a geared suspension cable reel 128 rotatably secured relative to the chassis 104 about which the cable assembly 116 may be wound and a housing 132 for containing the suspension cable reel 128 and cable assembly 116. Gear teeth arranged about a periphery of the suspension cable reel 128 are appropriately interconnected (e.g., meshed) with gear teeth arranged about a periphery of one of the drive gears 124 so that rotation of the drive gear 124 in one of first and second opposing rotational directions induces a corresponding rotational movement of the suspension cable reel 128 in the other of the first and second rotational directions for purposes of winding or unwinding the cable assembly 116.

FIG. 2b illustrates a view of the robotics module 100 with the platform assembly 108 being in a lowered position along the Z-axis 200 relative to the chassis 104. To manipulate a particular media element 45 in a storage library module 28 or a media element player 40 (e.g., grab and retrieve, read a label of, etc.), the platform assembly 108 may include a hand element or assembly 136 that may include any appropriate components such as a gripping assembly, a barcode reader, processors, circuitry and the like operable to manipulate the media elements 45. For instance, the drive assembly 112 may be appropriately operated to lower the platform assembly 108 along the Z-axis 200 to a particular location (e.g., height) within the channel 32 of the rack 12, such as to a particular location along the Z-axis 200 at which a particular media element 45 is located. The hand assembly 136 may be electrically interconnected to the power/controller module via a communications cable 144 or the like to allow for control of the hand assembly 136.

Furthermore, the hand assembly 136 may be appropriately moved or translated along an X-axis 204 to a particular location along the X-axis 204 at which the particular media element 45 is located. For instance, the platform assembly 108 may include a pair of rails 140 or the like along which a carriage (not shown) may be slid, moved or translated along the X-axis 204 (e.g., via a motor electrically interconnected with the power/controller module via any appropriate communications cable or the like, not shown), where the hand assembly 136 is mounted to the carriage. In one arrangement, the hand assembly 136 may be appropriately rotatably mounted to the carriage to allow the hand assembly 136 to be rotated in first and second opposing rotational directions about an axis that is generally parallel to the Z-axis 200 (e.g., via a motor electrically interconnected with the power/controller module via any appropriate communications cable or the like, not shown).

As discussed previously, it is desirable to prevent or at least limit the likelihood of inadvertent unwinding of a cable assembly and corresponding dropping or lowering (e.g., in the direction of gravity along the Z-axis) of a platform assembly during shipping, replacement, manual access, and/or the like in order to limit damage from occurring to the cable assembly, platform assembly, and/or other components of a robotics module. In this regard, existing platforms are typically spooled up (by fully winding up the cable assembly) and then locked against movement in either direction along the Z-axis. However, current arrangements for limiting or locking such movement of the cable assembly and platform (e.g., manually inserting a pawl in between adjacent teeth of a gear of the drive assembly of the robotics module that prevents rotational movement of the gear and thus the suspension cable reel in both of the first and second rotational directions) suffer from a number of inefficiencies such as still allowing the platform to drop along the Z-axis when the cable assembly and platform are being wound up into a storage position (i.e., because the cable assembly and platform cannot be wound up with the existing pawl is engaged with the gear teeth), limiting any further winding up or tightening of the cable assembly and platform that may otherwise occur due to vibrations or the like during shipping or the like, and necessitating the removal, storage, and inventory of the separate, removable pawl.

Figure 4:
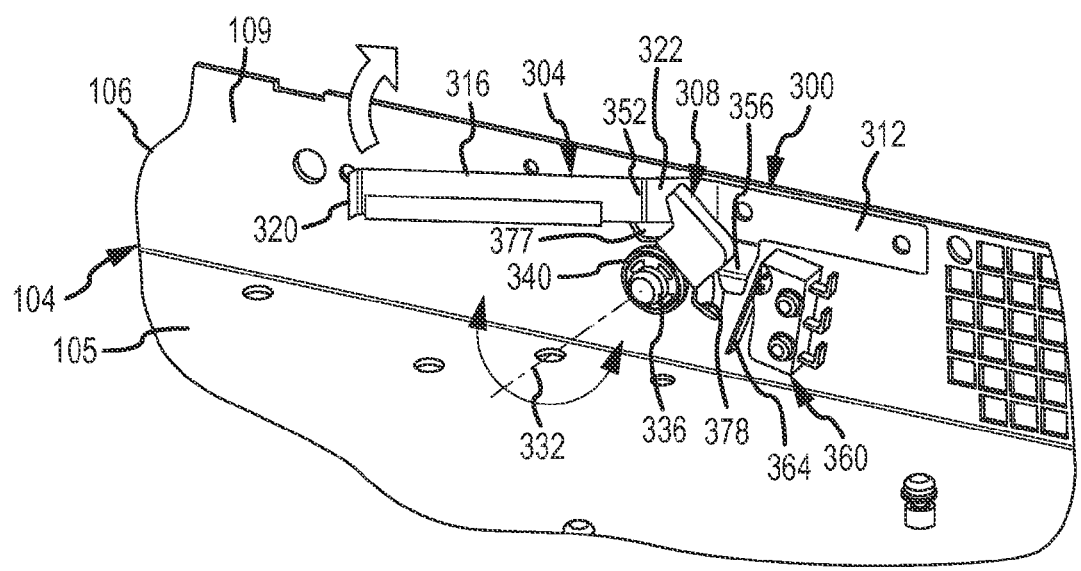

In this regard, and with additional reference now to FIG. 4, the robotics module 100 may include a locking assembly or system 300 (e.g., a locking subsystem) secured or securable to the chassis 104 that is manipulatable by a user between at least a first configuration that allows the suspension cable reel 128 to rotate in either of first and second opposing rotational directions so that the drive assembly 112 can either wind or unwind the cable assembly 116 to correspondingly raise or lower the platform assembly 108 along the Z-axis 200 (e.g., during normal operations of the robotics module 100, such as during the grabbing of a media element 45 and moving of the media element 45 to a media element player 40), and a second configuration that only allows the suspension cable reel 128 to rotation in the one of the first and second opposing rotational directions that winds up the cable assembly 116 and platform assembly 108. That is, the second configuration of the locking system 300 allows for winding up of the cable assembly 116 and platform assembly 108 (e.g., via the drive assembly 112, via vibrations, etc.) but disallows for unwinding of the cable assembly 116 and the platform assembly 108. Advantageously, the cable assembly 116 and platform 108 can be wound up in preparation for shipping, replacement of the robotics module 100, and/or the like substantially free of any likelihood of the cable assembly 116 inadvertently unwinding and the platform assembly 108 inadvertently dropping.

Broadly, the locking system 300 includes a locking member in the form of a ratchet pawl 304 having a portion thereof that is designed to engage between adjacent gear teeth 148 of one of the drive gears 124 of the drive assembly 112 (or, in other embodiments, between adjacent gear teeth of the suspension cable reel 128) for limiting rotational movement thereof in one of first and second opposing rotational directions, and an actuator 308 for manipulating the ratchet pawl 304 as will be described in more detail below. In one arrangement, the ratchet pawl 304 may be in the form of a spring-loaded member (e.g., leaf spring or the like) having a first or mounting member 312 that may be fixedly secured to (and non-movably relative to) any appropriate portion of the chassis 104 (e.g., front wall 106) in any appropriate manner (e.g., via rivets, bolts and nuts, welds, etc., not shown) and a second or engagement member 316 that is operable to selectively move (relative to the chassis 104) into and/or out of engagement between adjacent gear teeth 148 of the drive gear 124.

Stated differently, the ratchet pawl 304 may be cantilevered to the inside surface 109 of the front wall 106.

For instance, the engagement member 316 may have an engagement portion 320 thereon (e.g., at a free end of the engagement member 316 or at another appropriate location) that is sized, shaped, angled, and/or configured to enter the space between adjacent ones of the gear teeth 148 (e.g., at the roots of the adjacent gear teeth, see FIG. 7c) to limit rotational movement of the drive gear 124 (and thus of the suspension cable reel 128) in the one of the first and second opposing rotational directions (e.g., such as a clockwise direction in FIG. 7c) that would otherwise unwind the cable assembly 116 and thus lower the platform assembly 108 while still allowing for rotational movement of the drive gear 124 (and thus of the suspension cable reel 128) in the other of the first and second opposing rotational directions (e.g., such as a counterclockwise direction) that would allow for winding of the cable assembly 116 and thus raising of the platform assembly 108.

Figure 6A:
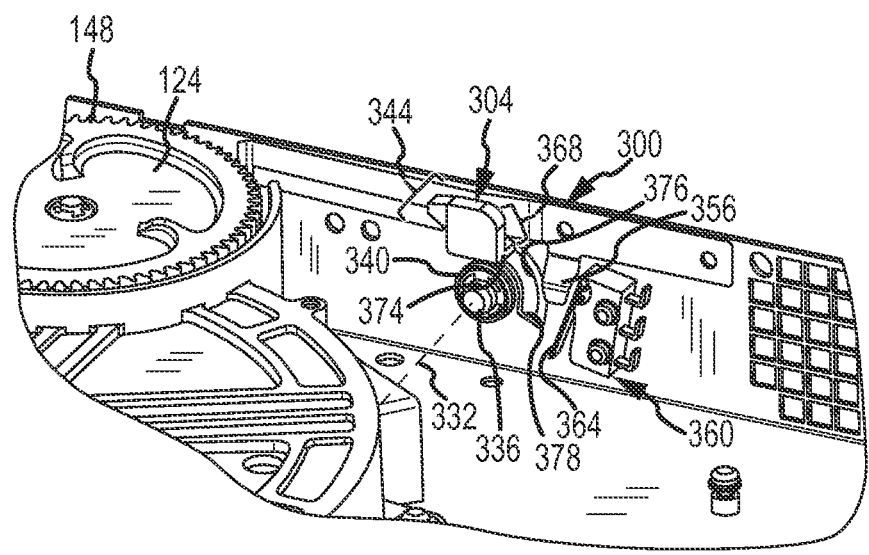
FIGS. 6a-6e illustrate various views of the locking system of FIG. 4 in a first, unlocked configuration that allows rotational movement of a suspension cable reel of the robotics module in first and second opposing rotational directions.
Figure 6B:
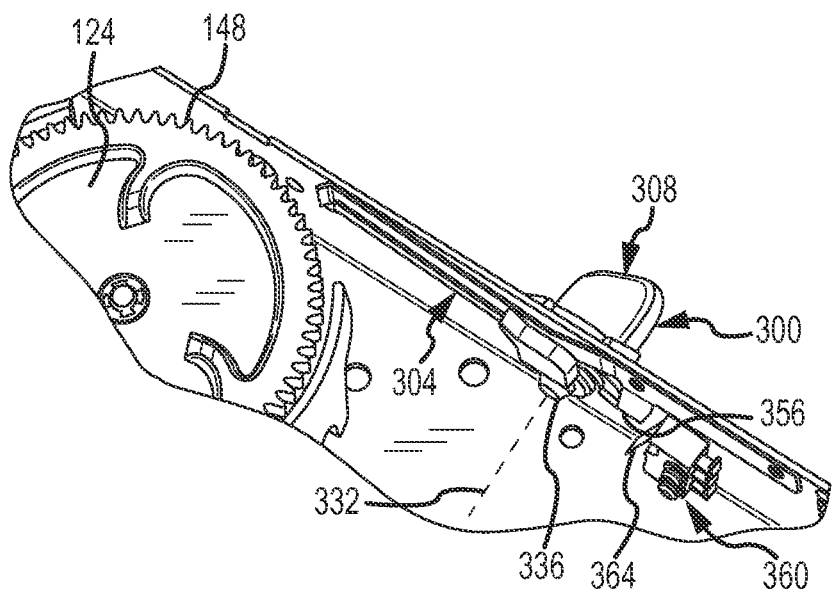
Figure 6C:
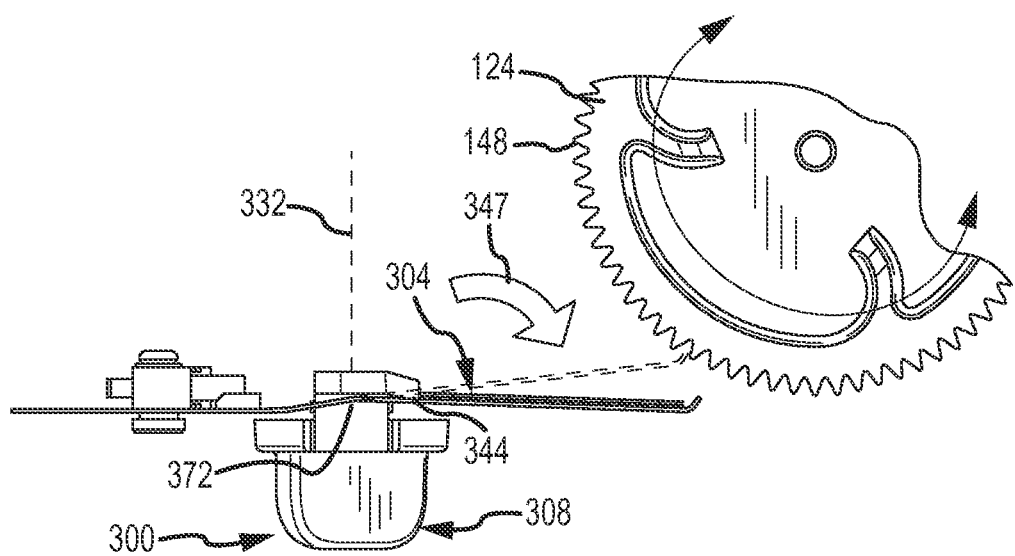
Figure 6D:
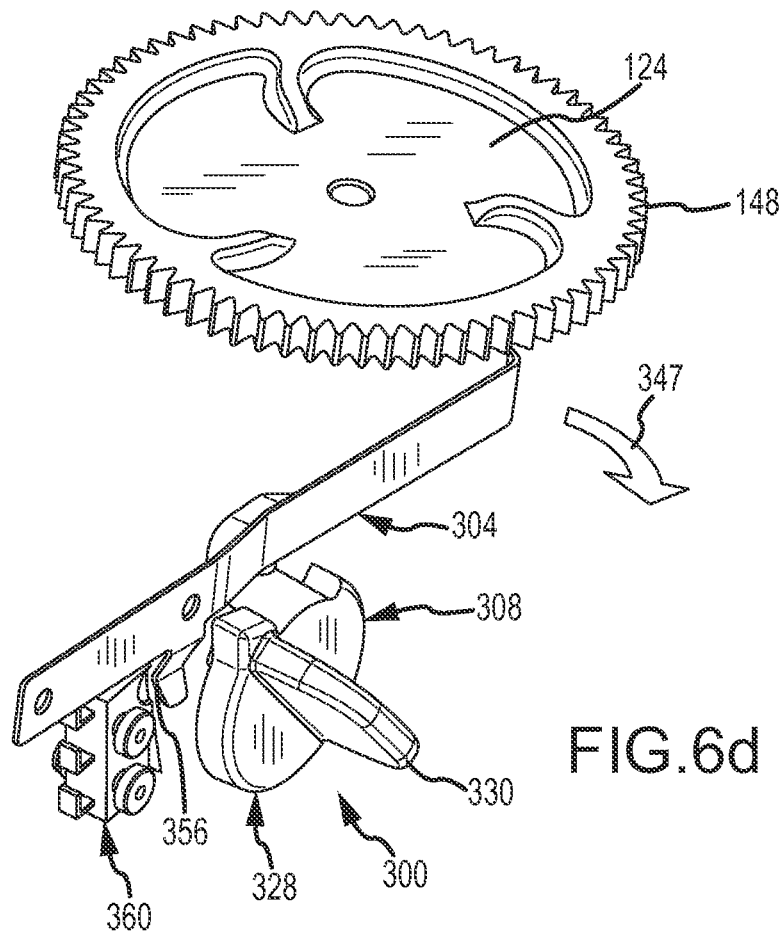
Figure 6E:
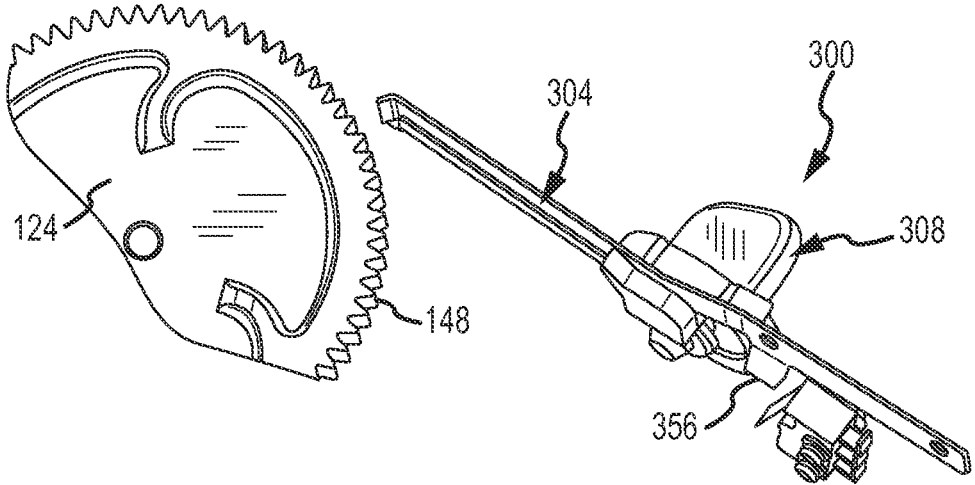
Figure 7A:
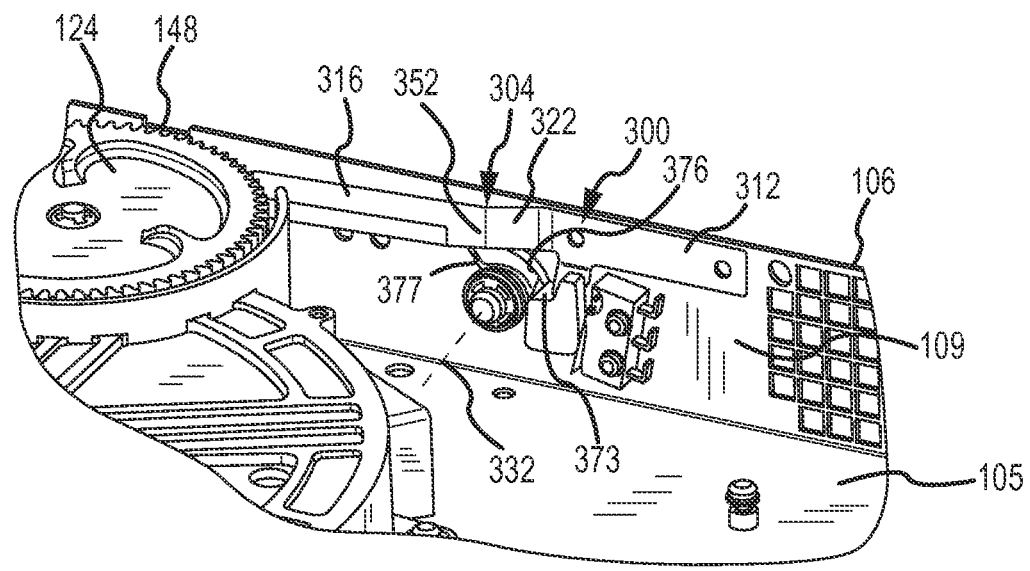
FIGS. 7a-7e illustrate various views of the locking system of FIG. 4 in a second, locked configuration that allows rotational movement of the suspension cable reel in one of the first and second rotational directions that winds up the cable assembly and platform but disallows rotational movement of the suspension cable reel in the other of the first and second rotational directions that unwinds the cable assembly and platform.
Figure 7B:
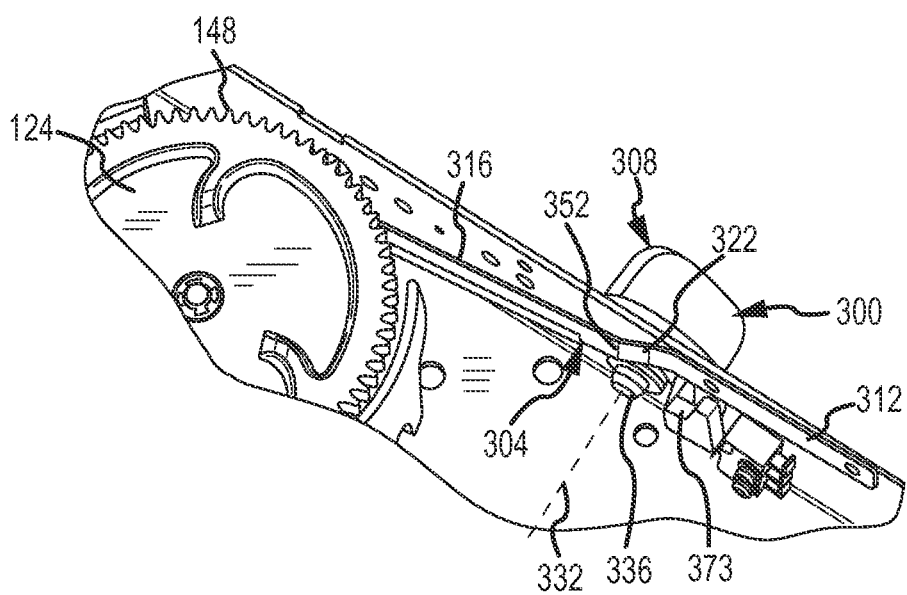
Figure 7C:
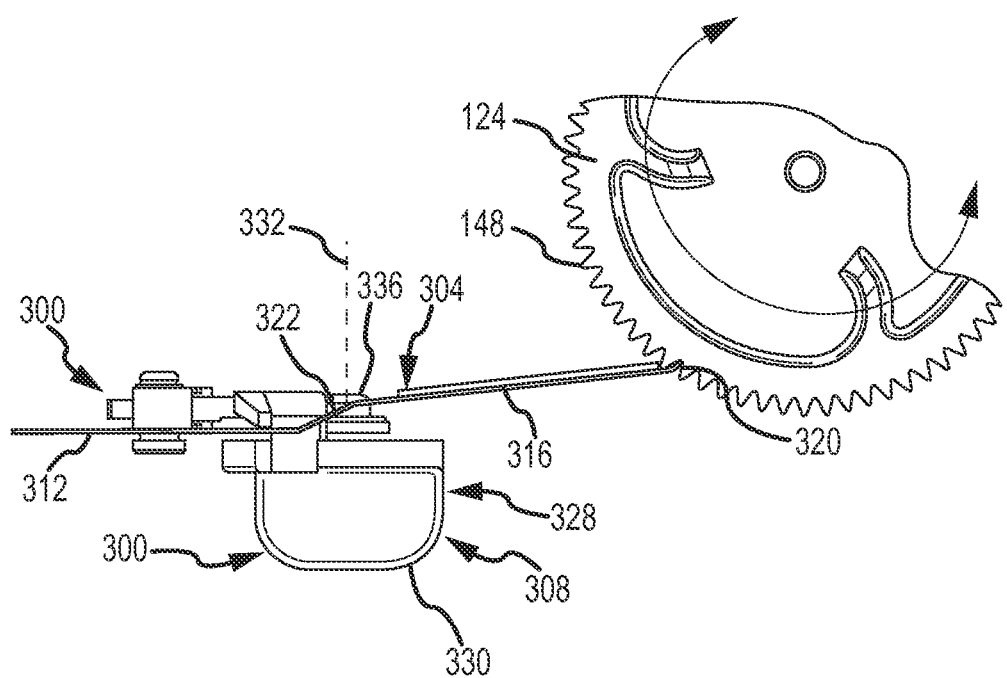
Figure 7D:
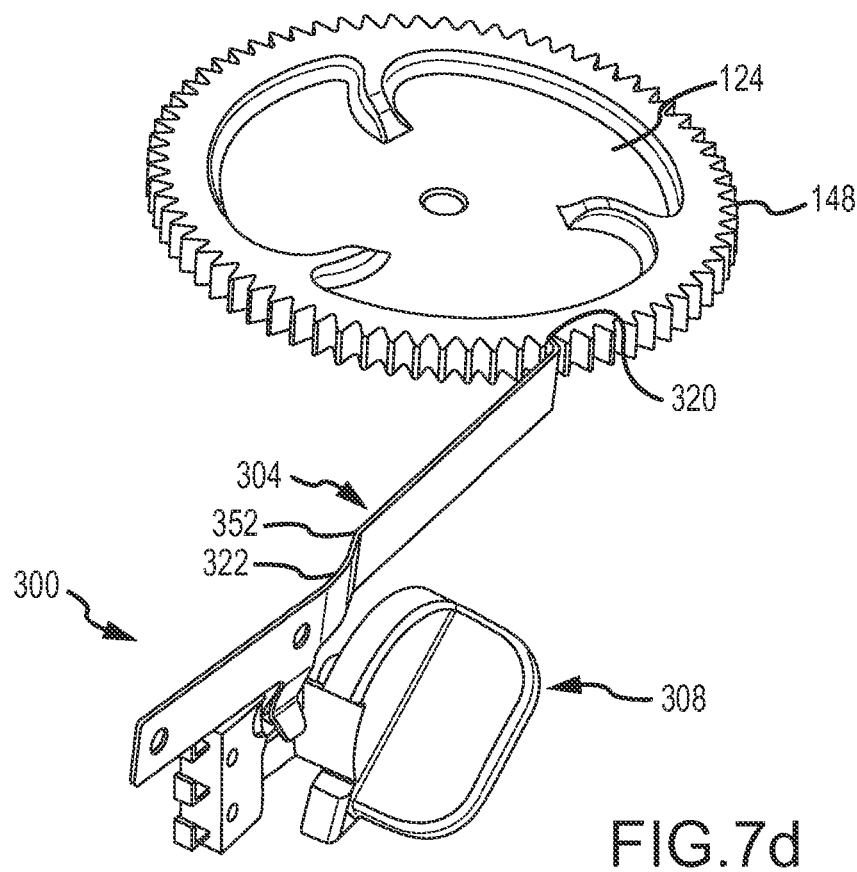
Figure 7E:
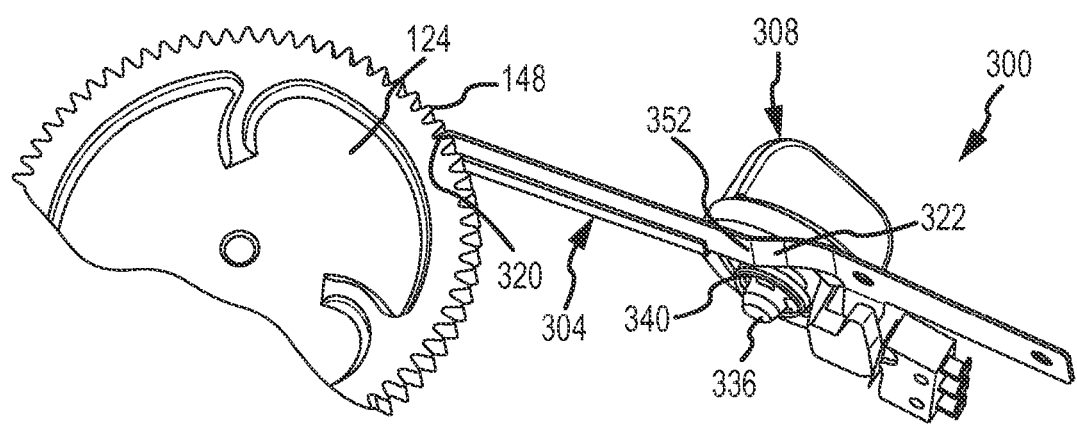

In one embodiment, the ratchet pawl 304 may be appropriately designed and mounted relative to the chassis 104 so that the engagement member 316 is normally biased into engagement with the gear teeth 148 of the drive gear 124 (as in FIG. 7c and as represented by the dotted lines in FIG. 6c) so as to only allow rotational movement of the drive gear 124 (and thus of the suspension cable reel 128) in a direction that winds up the cable assembly 116 and thus raises the platform assembly 108. With reference to FIG. 7c, for instance, it can be seen how any attempt to rotate the drive gear 124 in the clockwise direction would be resisted due to the angle and orientation of the engagement member 316 and engagement portion relative to the drive gear 124 and gear teeth 148. However, rotation of the drive gear 124 in the opposing counterclockwise direction in this example would be allowed. Specifically, it can be seen how the gear teeth 148 would, during the counterclockwise rotation of the drive gear 124, urge and bias the engagement member 316 and engagement portion 320 in a direction away from the gear teeth 148 and towards the front wall 106 of the chassis (against the spring force being built up in the engagement member 316) until the engagement member 320 exits the space between adjacent gear teeth 148. Thereafter, the spring force of the engagement member 316 serves to substantially immediately return the engagement portion 320 between each next set of adjacent gear teeth 148 in a ratcheting-like manner.

To move the engagement portion 320 of the engagement member 316 out of engagement with (i.e., to disengage the engagement member 316 from) the gear teeth 148 (as represented by the solid lines in FIG. 6c), the actuator 308 may be appropriately manipulated into at least a first position to urge the engagement member 316 away from the gear teeth 148, such as in a direction towards the front wall 106. Moving the engagement member 316 away from the gear teeth 148 (e.g., from the position of the dotted lines to the position of the solid lines in FIG. 6c) may entail moving the engagement member 316 (via the actuator 308) from a first, lower state of deflection into a second, higher state of deflection. In one arrangement, the engaged position of the engagement member 316 may be a substantially non-deflected or relaxed position while the disengaged position of the engagement member 316 may be some deflected position. In another arrangement, the engaged position of the engagement member 316 may still be a deflected position, but at some level lower than that of the disengaged position of the engagement member 316.

Figure 5:
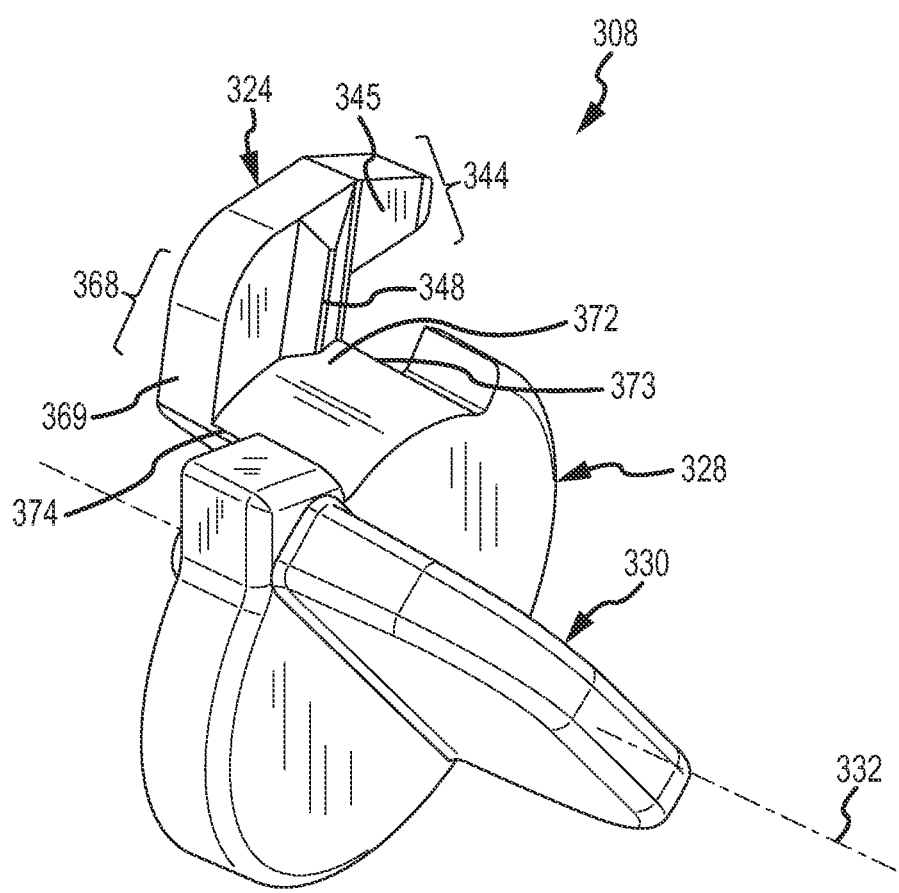
FIG. 5 is a perspective view of an actuator of the locking system of FIG. 4.

Broadly, the actuator 308 may be movably secured to a portion of the chassis 104 and may be manipulatable so as to urge the engagement member 316 into its first, disengaged (e.g., unlocked) position as illustrated in FIGS. 6a-6e to allow for winding and unwinding of the cable assembly 116 and platform assembly 108 of the robotics module 100. As shown in FIG. 5, the actuator may include a cam member 324 configured to urge the engagement member 316 into its disengaged position and a handle 328 (e.g., including a knob 330) rigidly secured or connected to the cam member 324 (i.e., where the handle 328 and cam member 324 are non-movably connected relative to each other), where manipulation of the handle 328 induces a corresponding manipulation of the cam member 328. In one arrangement, the actuator 308 may be pivotally or rotatably secured to the front wall 106 of the chassis 104 (e.g., about axis 332) so that the cam member 324 is disposed adjacent an inside surface 109 of the front wall 106 and the handle 328 is disposed adjacent an outside surface 110 of the front wall 106. See FIGS. 4, 6b and 7b. For instance, the actuator may include a pivot member 336 extending from the handle 328 along axis 332 that is configured to be received in a corresponding aperture (not shown) through the front wall 106 of the chassis (e.g., via the outside surface 110 of the front wall 106). Any appropriate lock washer 340 may then be disposed over the pivot member 336 from the inside surface 109 of the front wall 106 to pivotally or rotatably secure the actuator 308 to the chassis 104. However, numerous other manners of pivotally or movably securing the actuator 308 to the front wall 106 or other portion of the chassis 104 are also envisioned such as via pivot pins, bolts, and/or the like.

Returning to FIG. 5, the cam member 324 may include a first portion 344 operable to contact the engagement member 316 and push or urge the engagement member 316 away from the gear teeth into its first, disengaged position via a camming action as the handle 328 is being rotated into the first position. With specific reference to FIGS. 7a-7e, the engagement member 316 may include a contact portion 322 that is positioned to intersect a range of motion of the first portion 322 of the cam member 324 during rotation of the handle 328 about axis 332. In this regard, initial rotation (e.g., clockwise) of the handle 328 (e.g., via knob 330) about axis 332 from the second position shown in FIGS. 7a-7e may result in initial contact of the contact portion 322 of the engagement member 316 by the first portion 344 of the cam member 324. Thereafter, continued rotation of the handle 328 in the same rotational direction (e.g., in the clockwise direction) may cause the first portion 344 of the cam member 324 to urge or push the engagement member 316 (against any inherent spring force of the engagement member 316) away from the drive gear 124 in the direction 347 and towards the front wall 106 so that the engagement portion 320 exits the space between the adjacent gear teeth 148 (as in FIGS. 6a-6e) thus resulting in the ability of the drive gear 124 (and thus of the suspension cable reel 128) to move in either of first and second rotational directions (and thus allowing for winding or unwinding of the cable assembly 116 or the platform assembly 108). Of course, in the event that the first portion 344 of the cam member 324 is already in light or negligible contact with the contact portion 322 when the handle 328 is in the second position of FIGS. 7a-7e, rotation of the handle 328 towards the first position shown in FIGS. 6a-6e may immediately induce movement of the engagement member 316 away from the gear teeth 148 of the drive gear 124.

Furthermore, deflection of the engagement member 316 into the first position shown in FIGS. 6a-6e results in a spring force of the engagement member 316 being applied against the first portion 344 of the cam member 324 which serves to maintain or hold the cam member 324 (and thus the actuator 308 as a whole) in the first disengaged position/configuration shown in FIGS. 6a-6e (e.g., until the handle 328 is rotated in an opposite rotational direction, e.g., a counterclockwise direction, with a torque sufficient to overcome the spring force being applied against the first portion 344 of cam member 324). Other manners of holding or maintaining the actuator 308 in the first, disengaged position of FIGS. 6a-6e may be additionally employed. In one arrangement, the cam member 324 may be provided with a projection or detent 348 positioned to face and contact the engagement member 316 in the first, disengaged position of the actuator 308 (facing front wall 106). For instance, the detent 348 may be configured to be snap or otherwise be biased past a corresponding bump or detent 352 on the engagement member 316. See FIGS. 4, 7a, 7b, 7d and 7e. In one arrangement, the locking system 300 may be arranged so that upon the detent 348 just moving past the detent 352 (which may be associated with tactile feedback to the user), the engagement portion 320 may be fully removed and disengaged from the gear teeth 148 of the drive gear 124.

To move the engagement member 316 of the ratchet pawl 304 back into its second, engaged position shown in FIGS. 7a-7e from its first, disengaged position shown in FIGS. 6a-6e, the handle 328 may be rotated in an opposing rotational direction (e.g., counterclockwise) about axis 332 to remove the force being applied by the first portion 344 of the cam member 324 against the engagement member 316 (e.g., where the force being applied by the first portion 344 is opposite the spring force of the engagement member 316) and allow the engagement member 316 to move (via the spring force) back into its engaged position (where the engagement portion 320 is seated between adjacent gear teeth 148). See FIGS. 7a-7c. In one arrangement, the detent 348 of the cam member 324 may be configured to engage with (e.g., snap or be biased past) another detent 356 (e.g., of the ratchet pawl 304, on the front wall 106, adjacent front wall 106, etc.) to hold or maintain the actuator 308 in its second position and thus the engagement member 316 in its second, engaged position (i.e., with the engagement portion 320 seated between adjacent gear teeth 148). See FIGS. 4, 6a and 6b. Also, moving of the detent 348 past the detent 356 in the opposing rotational direction (the counterclockwise direction in this example) may provide tactile feedback to a user that the engagement portion 320 is in its second, engaged (e.g., locked) position whereby rotation of the drive gear 124 in a rotational direction that would allow for unwinding and thus lowering of the cable assembly 116 and platform assembly 108 is inhibited or disallowed.

In another arrangement, the locking system 300 may include any appropriate sensor 360 configured to detect when the engagement member 316 is in at least one of its engaged/locked or disengaged/unlocked positions and then signal the power/controller module (and/or other appropriate module) regarding the same. See FIGS. 4, 6a, 6b and 6e. As an example, the sensor 360 may be in the form of an electric switch (e.g., microswitch) secured to a portion of the chassis 104 (e.g., to front wall 106), electrically interconnected to the power/controller module, and including an actuation member 364 (e.g., lever, button, etc.) movable between at least first and second positions (e.g., off and on positions, respectively). For instance, the actuation member 364 may be positioned in the range of rotational travel of the cam member 324 so that upon rotation of the handle 328 and thus the cam member 324 into the second position (whereby the engagement portion 320 is engaged between adjacent gear teeth 148), a second portion 368 of the cam member 324 (see FIG. 5, e.g., opposed to the first portion 344) may be configured to contact the actuation member 364 and urge it (during continued rotation of the handle 328) into its second position (see FIGS. 7a, 7b and 7e) whereby a signal indicating the engaged, locked state of the engagement member 316 may be sent to the power/controller module and/or other appropriate location.

Of course, it is also envisioned that the sensor 360 could be appropriately arranged vice versa whereby the actuation member 364 is in an "on" position when the engagement member 316 is in the disengaged, unlocked state (when the handle 328 and cam member 324 are their first positions of FIGS. 6a-6e) and is switched to an off position when the engagement member 316 moves into its engaged, locked position. In one arrangement, the locking system 300 may be arranged so that the second portion 368 of the cam member 324 moves the actuation member 364 of the sensor 360 into the second position as or just after the detent 348 of the same member 324 snaps or moves past the detent 356. In another arrangement, engagement between the first portion 344 of the cam member 324 and the contact portion 322 of the engagement member 316 of the pawl 304 and engagement between the second portion 368 of the cam member 324 and the actuation member 364 of the sensor 360 may be mutually exclusive (i.e., may be not capable of occurring at the same time).

In a further arrangement, the rotational range of motion of the actuator 308 between its first and second positions (respectively corresponding to the disengaged, unlocked and engaged, locked positions of the engagement member 316 of the ratchet pawl 304) may be defined or limited in any appropriate manner. As an example, a transition portion 372 of the actuator 308 that interconnects the handle 328 and the cam member 324 may be sized and shaped to slide or ride in a corresponding slot or opening 376 defined through the front wall 106 of the chassis 104 (or through whichever portion of the chassis 104 that the actuator 308 is rotatably secured to) as the actuator 308 is being rotated between the first and second positions. See FIGS. 5, 6a and 7a. For instance, the slot 376 may be in the shape of an arc having opposing first and second end walls 377, 378 respectively corresponding to the first and second positions of the actuator 308.

In this regard, rotation of the actuator 308 (e.g., via the handle 328) about the axis 332 in a first rotational direction may cause a first side 373 (labeled in FIG. 7a) of the transition portion 372 to abut the first end wall 377 (labeled in FIG. 7a) upon the cam member 324 moving into its first position and the engagement member 316 of the ratchet pawl 304 moving into its first, disengaged position as in FIGS. 6a-6e. Also, rotation of the actuator 308 (e.g., via the handle 328) about the axis 332 in the opposed second rotational direction may cause a second side 374 (labeled in FIG. 6a) of the transition portion 372 to abut the second end wall 378 (labeled in FIG. 6a) upon the cam member 324 moving into its second position and the engagement member 316 of the ratchet pawl 304 moving into its second, engaged position as in FIGS. 7a-7e. In one embodiment, the actuator 308 may be held in its first position by virtue of: engagement between the first side 373 and the first end wall 377 in one direction of rotation and engagement between the detents 348, 352 in the other direction of rotation. Also, the actuator 308 may be held in its second position by virtue of: engagement between the second side 374 and the second end wall 378 in one direction of rotation and engagement between the detents 348, 356 in the other direction of rotation.

It will be readily appreciated that many additions and/or deviations may be made from the specific embodiments disclosed in the specification without departing from the spirit and scope of the invention. For instance, while it has been disclosed that the actuator 308 urges or biases the ratchet pawl 304 (i.e., the engagement member 316 of the ratchet pawl 304) into its first, disengaged position away from the gear teeth 148, it is also envisioned that the locking system 300 could be appropriately configured and arranged vice versa so that the actuator 308 urges or biases the ratchet pawl 304 (i.e., the engagement member 316 of the ratchet pawl 304) into its second, engaged position in between adjacent ones of the gear teeth 148. In this arrangement, the engagement member 316 of the ratchet pawl 304 could designed so as to be biased away from and out of engagement with the gear teeth 148, such as against or towards the inside surface 109 of the front wall 106 of the chassis 104 (or other appropriate location of the chassis), where rotation of the actuator 308 into its first position (e.g., where first side 373 of transition portion 372 contacts or abuts first side wall 377 of slot 376) would urge the engagement member 316 into its engaged position (e.g., where the engagement portion 320 is seated between adjacent gear teeth 148).

As another example, it is envisioned that the actuator may be linearly movable between its first and second positions instead of rotatable movable between its first and second positions as described herein. For instance, one embodiment encompassed herein envisions that the slot 376 may be a linearly arranged opening (as opposed to an arc-shaped opening as shown in the figures), where the transition portion 372 travels in the linearly shaped opening between the first and second positions. As a further example, the locking system 300 could be arranged and configured so that the actuator 308 urges the engagement member 316 into both of its engaged and disengaged positions (e.g., in the case where the ratchet pawl 304 was not a spring-loaded member).

The illustrations and discussion herein has only been provided to assist the reader in understanding the various aspects of the present disclosure. Furthermore, one or more various combinations of the above discussed arrangements and embodiments are also envisioned. While this disclosure contains many specifics, these should not be construed as limitations on the scope of the disclosure or of what may be claimed, but rather as descriptions of features specific to particular embodiments of the disclosure. Furthermore, certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software and/or hardware product or packaged into multiple software and/or hardware products.

The above described embodiments including the preferred embodiment and the best mode of the invention known to the inventor at the time of filing are given by illustrative examples only.

I claim:

1. A robotics module for manipulating media elements in a storage library, comprising:
    a chassis;
    a platform assembly for manipulating media elements in a storage library;
    a drive assembly secured to the chassis, the drive assembly including a suspension cable reel;
    a cable assembly secured between the suspension cable reel and the platform, wherein rotation of the suspension cable reel in a first rotation direction unwinds the cable assembly from the suspension cable reel and allows the platform assembly to move in a first direction along an axis relative to media elements in the storage library, and wherein rotation of the suspension cable reel in an opposed second rotation direction winds the cable assembly on the suspension cable reel and moves the platform assembly in an opposed second direction along the axis relative to the media elements in the storage library; and
    a locking system secured to the chassis and manipulatable between at least first and second configurations, wherein manipulation of the locking system into the first configuration allows the suspension cable reel to move in either of the first and second rotation directions, and wherein manipulation of the locking system into the second configuration disallows the suspension cable reel from moving in the first rotation direction and allows the suspension cable reel to move in the second rotation direction.

2. The robotics module of claim 1, wherein the locking system comprises:
    a pawl comprising at least a portion thereof movable between at least first and second positions when the locking system is in the first and second configurations, respectively, wherein the pawl is disengaged from the drive assembly in the first position, and wherein the pawl is engaged with the drive assembly in the second position; and
    an actuator manipulatable to move the pawl into at least one of the first and second positions.

3. The robotics module of claim 2, wherein the drive assembly comprises a plurality of gear teeth, and wherein the portion of the pawl is disposed between adjacent gear teeth of the plurality of gear teeth in the second position of the pawl.

4. The robotics module of claim 3, wherein the plurality of gear teeth are disposed around a periphery of a drive gear of the drive assembly, and where rotation of the drive gear induces rotation of the suspension cable reel.

5. The robotics module of claim 3, wherein the plurality of gear teeth are disposed around a periphery of the suspension cable reel.

6. The robotics module of claim 2, wherein the pawl comprises a spring-loaded arm, wherein the first, disengaged position comprises a deflected state of the spring-loaded arm, wherein the second, engaged position comprises a substantially non-deflected state of the spring-loaded arm, and wherein the actuator is manipulatable to urge the spring-loaded arm into the deflected state.

7. The robotics module of claim 2 wherein the actuator comprises:
    a handle movably secured to the chassis between at least first and second positions; and a cam member rigidly secured to the handle and movable between the first and second positions of the handle, wherein the cam member urges the pawl into the first pawl position to disengage the pawl from the drive assembly so that the cable suspension wheel is allowed to move in either of the first and second rotation directions in the first handle position, and wherein the pawl moves into the second pawl position to engage the pawl with the drive assembly so that the cable suspension wheel is disallowed from moving in the first rotation direction and allowed to move in the second rotation direction in the second handle position.

8. The robotics module of claim 7, wherein the pawl comprises a spring-loaded arm, wherein the spring-loaded arm is in a first state of deflection in the first position of the pawl, wherein the spring-loaded arm is in a second state of deflection in the second position of the pawl, and wherein the second state of deflection is less than the first state of deflection.

9. The robotics module of claim 7, wherein the handle comprises a knob that is rotatably connected to the chassis between the first and second positions.

10. The robotics module of claim 9, wherein the pawl comprises a spring-loaded arm, wherein the spring-loaded arm is in a first state of deflection in the first position of the pawl, wherein the spring-loaded arm is in a second state of deflection in the second position of the pawl, and wherein the second state of deflection is less than the first state of deflection.

11. The robotics module of claim 7, wherein the locking system further comprises an electric switch movable between at least first and second positions, wherein the cam member moves the electric switch into the second position when the handle is moved into the second handle position, and wherein the electric switch moves into the first position when the handle is moved into the first handle position.

12. The robotics module of claim 11, wherein movement of the electric switch into the second position generates a control signal that is sent to a controller of the robotics module.

13. The robotics module of claim 11, wherein the cam member comprises first and second opposing portions, wherein the first portion engages the pawl, and wherein the second portion engages the electric switch.

14. The robotics module of claim 13, wherein engagement between the first portion and the pawl and engagement between the second portion and the electric switch are mutually exclusive.

15. The robotics module of claim 13, wherein the locking system further comprises a first detent on the cam member and a second detent adjacent the chassis, where the first detent engages the second detent upon the second portion engaging the electric switch.

16. The robotics module of claim 15, wherein the pawl comprises a spring-loaded arm, wherein the spring-loaded arm is in a first state of deflection in the first position of the pawl, wherein the spring-loaded arm is in a second state of deflection in the second position of the pawl, and wherein the second state of deflection is less than the first state of deflection.

17. The robotics module of claim 11, wherein the pawl comprises a spring-loaded arm, wherein the spring-loaded arm is in a first state of deflection in the first position of the pawl, wherein the spring-loaded arm is in a second state of deflection in the second position of the pawl, and wherein the second state of deflection is less than the first state of deflection.

18. The robotics module of claim 7, wherein the actuator further comprises:
  a transition member rigidly interconnecting the handle and the cam member, wherein the transition member travels within a slot within the chassis to define a range of motion of the actuator.

19. The robotics module of claim 18, wherein the pawl comprises a spring-loaded arm, wherein the spring-loaded arm is in a first state of deflection in the first position of the pawl, wherein the spring-loaded arm is in a second state of deflection in the second position of the pawl, and wherein the second state of deflection is less than the first state of deflection.

20. The robotics module of claim 18, wherein the handle comprises a knob that is rotatably connected to the chassis between the first and second positions.

* * * * *